(12) United States Patent
Han et al.

(10) Patent No.: US 12,157,342 B2
(45) Date of Patent: *Dec. 3, 2024

(54) SYSTEM AND METHOD FOR CONTROLLING VEHICLE

(71) Applicant: HYUNDAI MOBIS CO., LTD., Seoul (KR)

(72) Inventors: Sang Oh Han, Seoul (KR); Won Hyok Choi, Seoul (KR); Tae Heon Lee, Yongin-si (KR); Kyongwon Min, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,377

(22) Filed: Jun. 19, 2023

(65) Prior Publication Data
US 2023/0331058 A1 Oct. 19, 2023

Related U.S. Application Data

(63) Continuation of application No. 17/495,037, filed on Oct. 6, 2021, now Pat. No. 11,718,139.

(30) Foreign Application Priority Data

Oct. 7, 2020 (KR) .................. 10-2020-0129634
Dec. 17, 2020 (KR) .................. 10-2020-0177659

(51) Int. Cl.
*B60G 17/0165* (2006.01)
*B60G 17/018* (2006.01)
*B62D 21/14* (2006.01)

(52) U.S. Cl.
CPC ....... *B60G 17/0165* (2013.01); *B60G 17/018* (2013.01); *B60G 2400/208* (2013.01);
(Continued)

(58) Field of Classification Search
CPC .............. B60G 17/0165; B60G 17/018; B60G 2400/208; B60G 2400/252;
(Continued)

(56) References Cited

U.S. PATENT DOCUMENTS 7,562,887 B1 7/2009 Sutton et al.
9,227,637 B2 * 1/2016 Nakatsu ................ B60W 10/08
(Continued)

FOREIGN PATENT DOCUMENTS

CN 113183706 A 7/2021
KR 10-0313794 B1 2/2002

*Primary Examiner* — Toan C To
(74) *Attorney, Agent, or Firm* — NSIP Law

(57) ABSTRACT

A system and method for controlling a vehicle, where the system includes independent driving modules each including a connection device having a rotation center spaced apart from a driving shaft in a forward/rearward direction and configured to connect the wheel and a vehicle body to move the wheel in the forward/rearward or an upward/downward direction, a shock absorber extending in a longitudinal direction and configured to contract or stretch, to connect the vehicle body and the connection device, and to restrict an upward/downward movement of the connection device, and a driving device configured to rotate the wheel, a road surface detector configured to detect a height displacement or a state of a road, and a controller configured to control velocities of the front and rear wheels of the independent driving modules, and to change a height of the vehicle based on the height displacement or the state of the road.

18 Claims, 11 Drawing Sheets

(52) U.S. Cl.
CPC .... *B60G 2400/252* (2013.01); *B60G 2400/40* (2013.01); *B60G 2400/82* (2013.01); *B60G 2500/30* (2013.01); *B62D 21/14* (2013.01)

(58) Field of Classification Search
CPC ............ B60G 2400/40; B60G 2400/82; B60G 2500/30; B62D 21/14
See application file for complete search history.

(56) References Cited

U.S. PATENT DOCUMENTS

| | | | |
|---|---|---|---|
| 10,421,465 | B1 | 9/2019 | Jutkowitz et al. |
| 11,235,632 | B2 * | 2/2022 | Maier .................... B60G 3/145 |
| 11,718,139 | B2 * | 8/2023 | Han ....................... B60G 3/185 |
| | | | 280/5.507 |
| 2005/0098964 | A1 | 5/2005 | Brown |
| 2005/0205329 | A1 * | 9/2005 | Fanger-Vexler ..... B60K 17/356 |
| | | | 280/6.154 |
| 2009/0273159 | A1 | 11/2009 | Sutton |
| 2010/0307240 | A1 | 12/2010 | Tezuka et al. |
| 2015/0057885 | A1 | 2/2015 | Brady et al. |
| 2015/0088379 | A1 | 3/2015 | Hirao |
| 2015/0266505 | A1 * | 9/2015 | Merkel .................. B62D 7/144 |
| | | | 180/411 |
| 2016/0347143 | A1 | 12/2016 | Hrovat et al. |
| 2018/0250999 | A1 | 9/2018 | Golin |
| 2020/0223270 | A1 | 7/2020 | Kunkel et al. |

\* cited by examiner

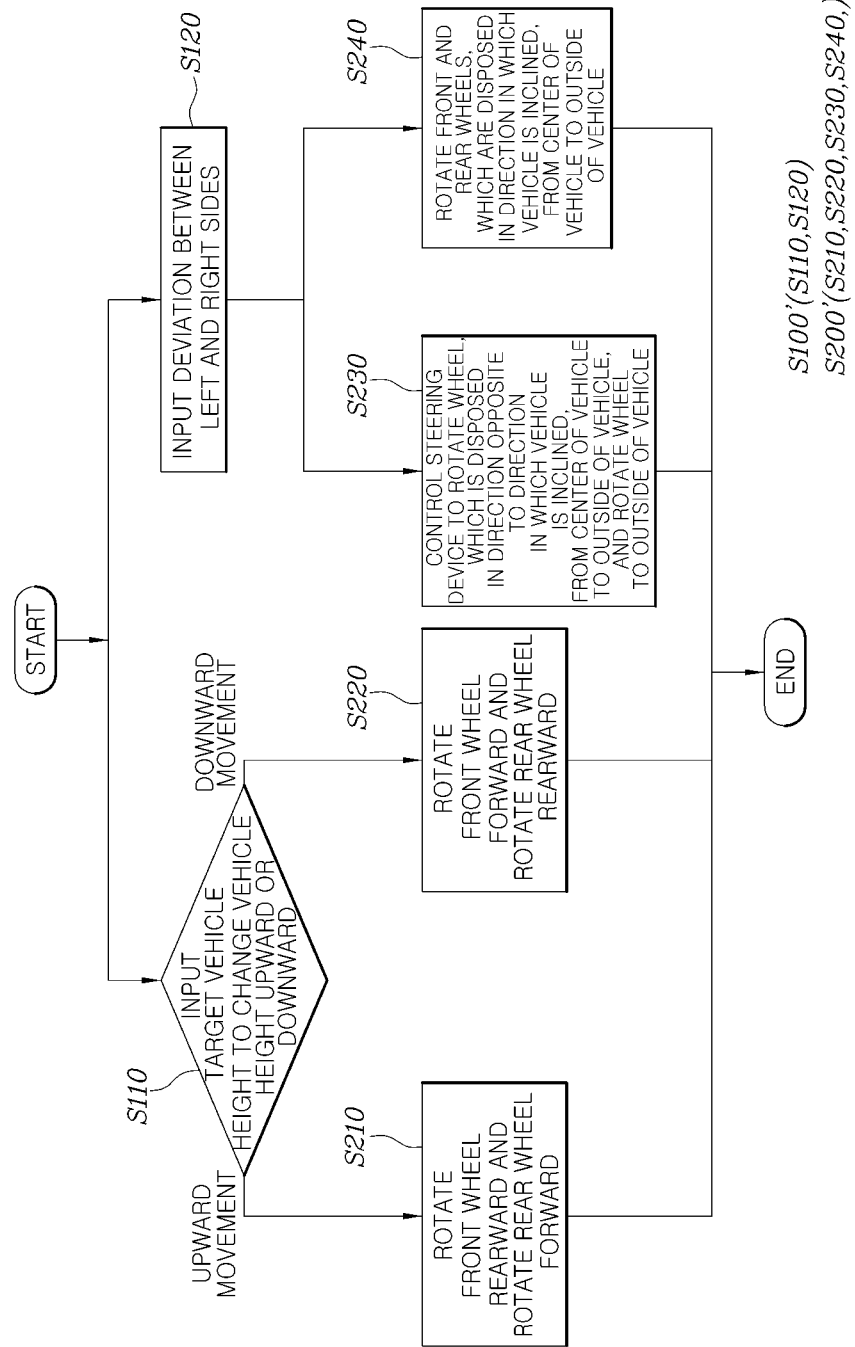

SYSTEM AND METHOD FOR CONTROLLING VEHICLE

CROSS REFERENCE TO RELATED APPLICATION

This application is a continuation of U.S. application Ser. No. 17/495,037 filed on Oct. 6, 2021, which claims the benefit under 35 USC 119 (a) of Korean Patent Application No. 10-2020-0177659, filed on Dec. 17, 2020, and to Korean Application No. 10-2020-0129634, filed on Oct. 7, 2020, in the Korean Intellectual Property Office, the entire disclosure of which are incorporated herein by reference for all purposes.

BACKGROUND OF THE INVENTION

Field of the Invention

The following description relates to a system and method for controlling a vehicle, and more particularly, to a technology for adjusting a vehicle height of a vehicle by controlling an independent driving module mounted in the vehicle.

Description of the Related Art

A separate air pressure adjustment device is mounted in a vehicle in the related art to adjust a vehicle height of the vehicle when a passenger gets in or out of the vehicle or freight is loaded or to adjust an air pressure of a suspension mounted in the vehicle to implement a deviation between left and right sides of the vehicle. The air pressure adjustment device may adjust the vehicle height or implement the deviation between the left and right sides of the vehicle.

There is a problem in that the air pressure adjustment device in the related art is difficult to maintain. Further, there is a problem in that when the air pressure adjustment device is broken down, the air pressure decreases, which causes a decrease in vehicle height.

The foregoing explained as the background is intended merely to aid in the understanding of the background of the present invention, and is not intended to mean that the present invention falls within the purview of the related art that is already known to those skilled in the art.

The foregoing explained as the background is intended merely to aid in the understanding of the background of the present invention, and is not intended to mean that the present invention falls within the purview of the related art that is already known to those skilled in the art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect there is provided a system for controlling a vehicle, the system including independent driving modules each including a connection device having a rotation center spaced apart from a driving shaft of a wheel in a forward/rearward direction and being configured to connect the wheel and a vehicle body so that the wheel is moved in the forward/rearward direction or an upward/downward direction, a shock absorber extending in a longitudinal direction and being configured to contract or stretch, to connect the vehicle body and the connection device, and to restrict an upward/downward movement of the connection device, and a driving device configured to rotate the wheel, a road surface detector configured to detect a height displacement or a state of a road surface, and a controller configured to control velocities of the front and rear wheels of the independent driving modules, and to change a vehicle height of the vehicle based on the height displacement or the state of the road surface.

The independent driving module may be mounted on each of the wheels of the vehicle and is configured to independently operate the wheel.

The connection device may include a body part having one end connected to the vehicle body, and a connection link provided in the form of a four-joint link, the connection link being configured to connect the other end of the body part and the wheel, to have a rotation center spaced apart from the driving shaft of the wheel, and to move the wheel in the forward/rearward direction or the upward/downward direction.

The connection devices mounted on the front and rear wheels may be symmetrically mounted on the vehicle body.

The road surface detector may be connected to an ultrasonic sensor mounted in the vehicle and may be configured to detect the height displacement or the state of the road surface.

The system may include a calculator configured to calculate a required height of the vehicle, in response to the height displacement of the road surface detected by the road surface detector exceeding a preset value, wherein the controller may be configured to control the velocities of the front and rear wheels of the independent driving modules, and to change the vehicle height based on the required height calculated by the calculator.

In response to the height displacement of the road surface detected by the road surface detector exceeding a threshold, the controller may be configured to increase the vehicle height by decreasing the velocity of the front wheel of the vehicle, increasing the velocity of the rear wheel of the vehicle, and increasing a length of the connection device in the upward/downward direction.

The system may include a velocity detector configured to detect the velocity of the wheel of the vehicle, and a measurer configured to measure a slip of the wheel based on the velocity of the wheel detected by the velocity detector and the state of the road surface detected by the road surface detector, wherein the controller may be configured to control the velocities of the front and rear wheels of the independent driving modules based on the slip of the wheels measured by the measurer.

The controller may be configured to increase the vehicle height by decreasing the velocity of the front wheel of the vehicle, increasing the velocity of the rear wheel of the vehicle, and increasing lengths of the connection devices in the upward/downward direction, and wherein the controller may be configured to increase a velocity difference between the front and rear wheels based on the amount of increase in the slip of the wheel measured by the measurer.

The system may include a roughness determiner configured to determine roughness of the road surface based on the state of the road surface detected by the road surface detector, wherein the controller may be configured to control the velocities of the front and rear wheels of the independent driving modules based on the roughness of the road surface determined by the roughness determiner.

The controller may be configured to increase the vehicle height by decreasing the velocity of the front wheel of the vehicle, increasing the velocity of the rear wheel of the vehicle, and increasing lengths of the connection devices in the upward/downward direction, and wherein the controller may be configured to increase a velocity difference between the front and rear wheels, in response to the roughness of the road surface being determined to be low.

The system may include an input configured to receive an input of a target vehicle height of the vehicle or a deviation between left and right sides of the vehicle, wherein the controller may be configured to control operations of the independent driving modules to change the vehicle height of the vehicle based on the target vehicle height of the vehicle.

The controller may be configured to control the independent driving modules so that the front wheel of the vehicle rotates rearward, the rear wheel rotates forward, lengths of the connection devices increase, the shock absorbers may be stretched, and the vehicle height may be increased, in response to the target vehicle height increasing the vehicle height of the vehicle.

The controller may be configured to control the independent driving modules so that the front wheel of the vehicle rotates forward, the rear wheel rotates rearward, lengths of the connection devices decrease, the shock absorbers may be compressed, and the vehicle height may be decreased, in response to the target vehicle height decreasing the vehicle height of the vehicle.

The independent driving modules each include a steering device configured to steer a direction of the wheel by rotating the connection device, and the controller may be configured to control the steering device to rotate the wheel, which is disposed in a direction opposite to the direction in which the vehicle is inclined, from a center of the vehicle to the outside of the vehicle, and the controller is further configured to control the driving device to rotate the wheel to the outside of the vehicle in response to the deviation between the left and right sides is inputted to the input unit to incline the vehicle to a left or right side.

The controller may be configured to control the driving devices to rotate the front and rear wheels, which are disposed in the direction in which the vehicle is inclined, from a center of the vehicle to the outside of the vehicle, in response to the deviation between the left and right sides being receiver at the input unit to incline the vehicle to a left or right side.

In another general aspect there is provided a method of controlling a vehicle using the system for controlling a vehicle, the method including operating independent driving modules each including a connection device having a rotation center spaced apart from a driving shaft of a wheel in a forward/rearward direction and being configured to connect the wheel and a vehicle body so that the wheel is moved in the forward/rearward direction or an upward/downward direction, a shock absorber extending in a longitudinal direction and being configured to contract or stretch, to connect the vehicle body and the connection device, and to restrict an upward/downward movement of the connection device, and a driving device configured to rotate the wheel, detecting a height displacement or a state of a road surface on which the vehicle travels, and controlling velocities of the front and rear wheels of the independent driving modules, and changing the vehicle height of the vehicle based on the height displacement or the state of the road surface.

The method may include calculating a required height of the vehicle, in response to the height displacement of the road surface exceeding a preset value, detecting the velocity of the wheel of the vehicle after the road surface detection step, measuring a slip of the wheel based on the velocity of the wheel detected in the velocity detection step and the state of the road surface detected in the road surface detection step, and setting a velocity difference between the front and rear wheels based on the amount of increase in the slip of the wheel, wherein the controlling of the velocities of the front and rear wheels of the independent driving modules comprises controlling operations of the independent driving modules to change the vehicle height of the vehicle by changing the velocities of the front and rear wheels of the vehicle using the velocity difference between the front and rear wheels based on the calculated required height.

The method may include inputting a target vehicle height of the vehicle or a deviation between left and right sides of the vehicle, wherein the changing of the vehicle height of the vehicle comprises controlling the independent driving modules to change the vehicle height of the vehicle based on the inputted target vehicle height of the vehicle.

The inputting may include inputting the deviation between the left and right sides and inputting the vehicle height of the vehicle, and controlling and rotating the steering device of the independent driving module based on the inputted deviation between the left and right sides.

Other features and aspects will be apparent from the following detailed description, the drawings, and the claims.

BRIEF DESCRIPTION OF THE DRAWINGS

FIG. 11 is a flowchart illustrating a vehicle control method according to still another embodiment of the present invention.

DETAILED DESCRIPTION OF THE INVENTION

Figure 1:
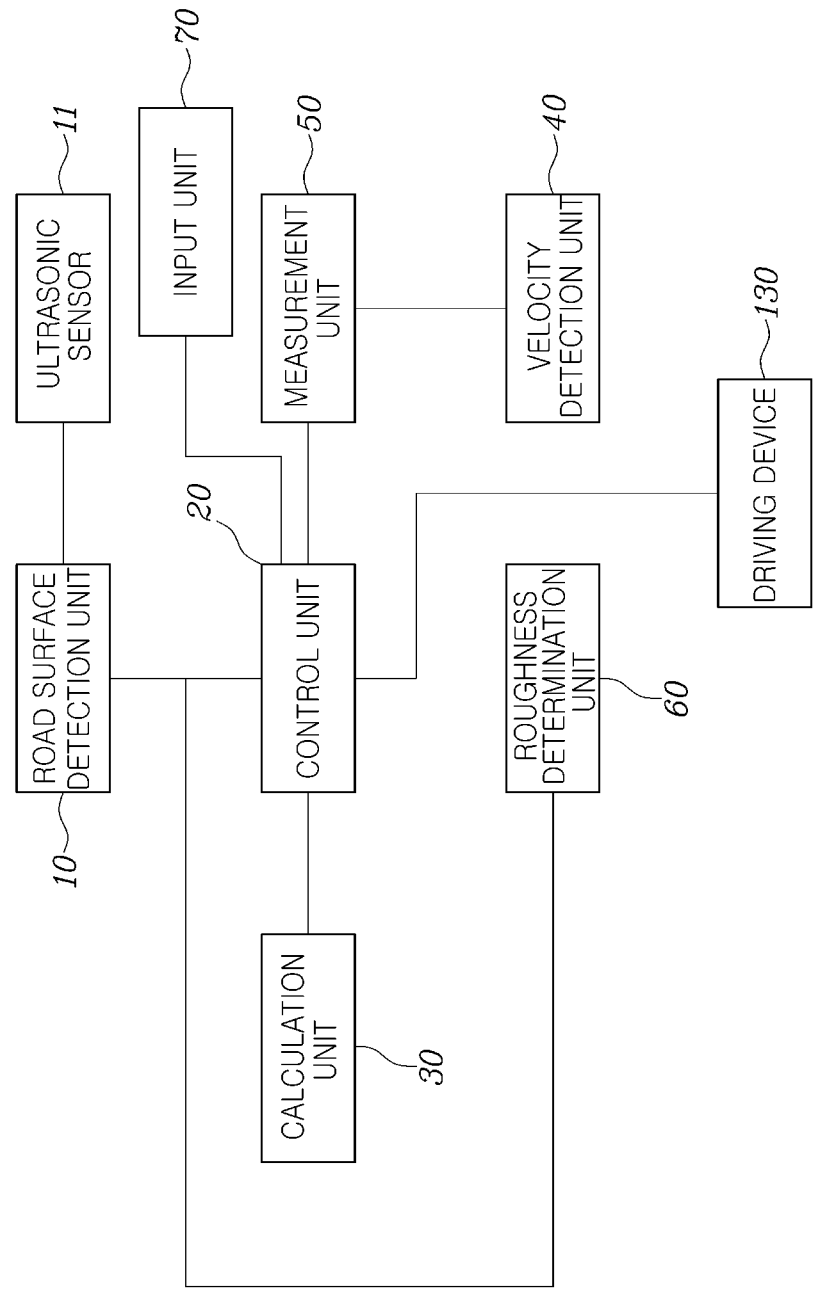
FIG. 1 is a configuration view illustrating a vehicle control system according to an embodiment of the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first," "second," and other numerical terms may be used herein only to describe various elements, but these elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, an exemplary embodiment of the present invention will be described in detail with reference to the accompanying drawings. Like reference numerals indicated in the respective drawings refer to like members.

A road surface detection unit 10 (may also be referred to as detector 10), a control unit 20 (may also be referred to as controller 20), a calculation unit 30 (may also be referred to as calculator 30), a velocity detection unit 40 (may also be referred to as velocity detector 40), a measurement unit 50 (may also be referred to as measurer 50), a roughness determination unit 60 (may also be referred to as roughness determiner 60), and an input unit 70 (may also be referred to as input 70), and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

Figure 2:
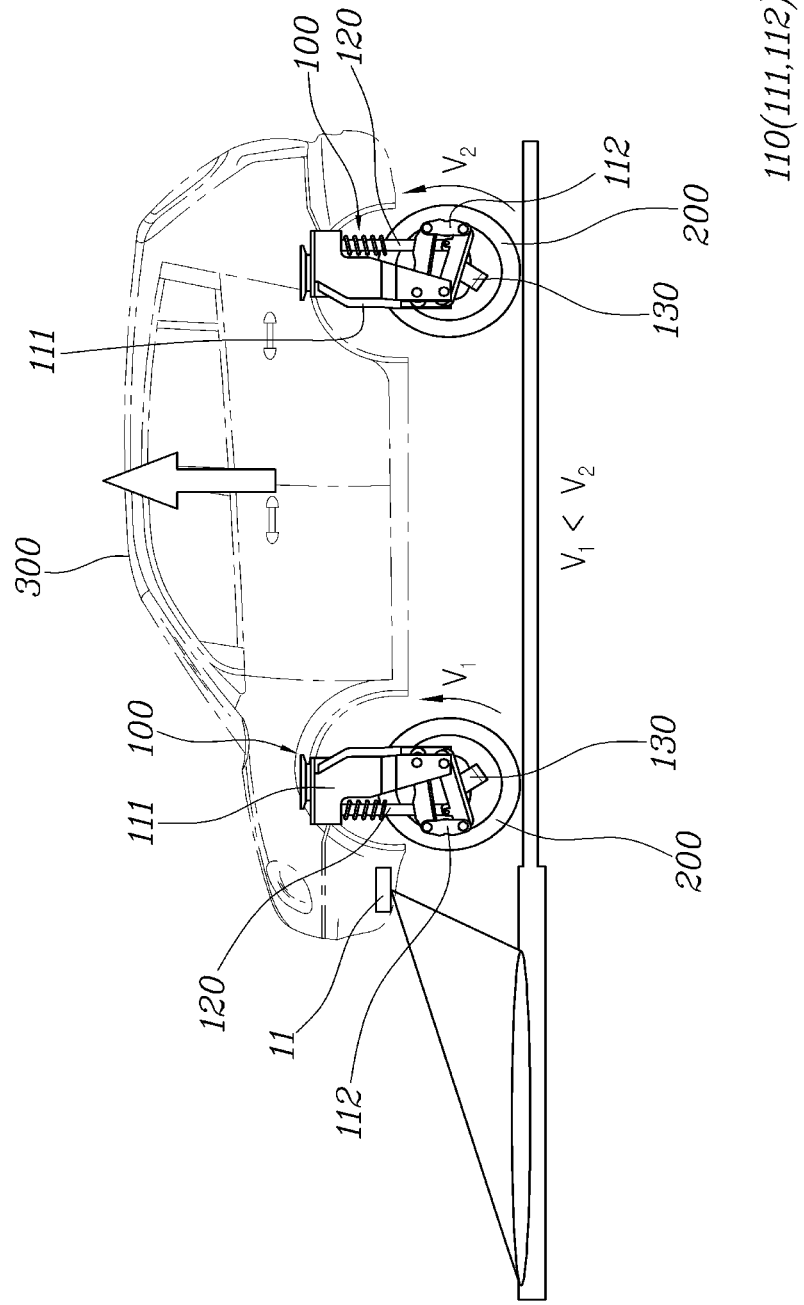
FIG. 2 is a side view illustrating a state in which a vehicle body is raised.
Figure 3:
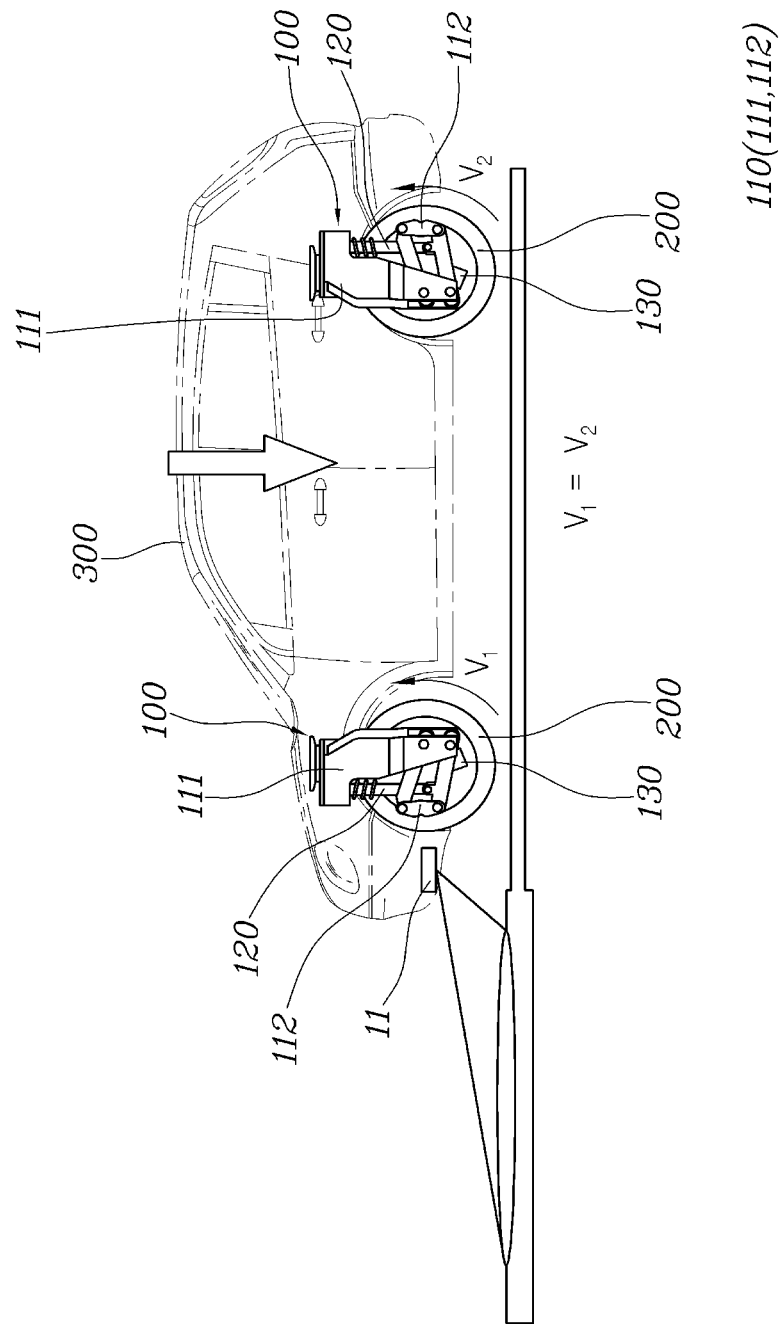
FIG. 3 is a side view illustrating a state in which the vehicle body is restored to an original position.
Figure 4:
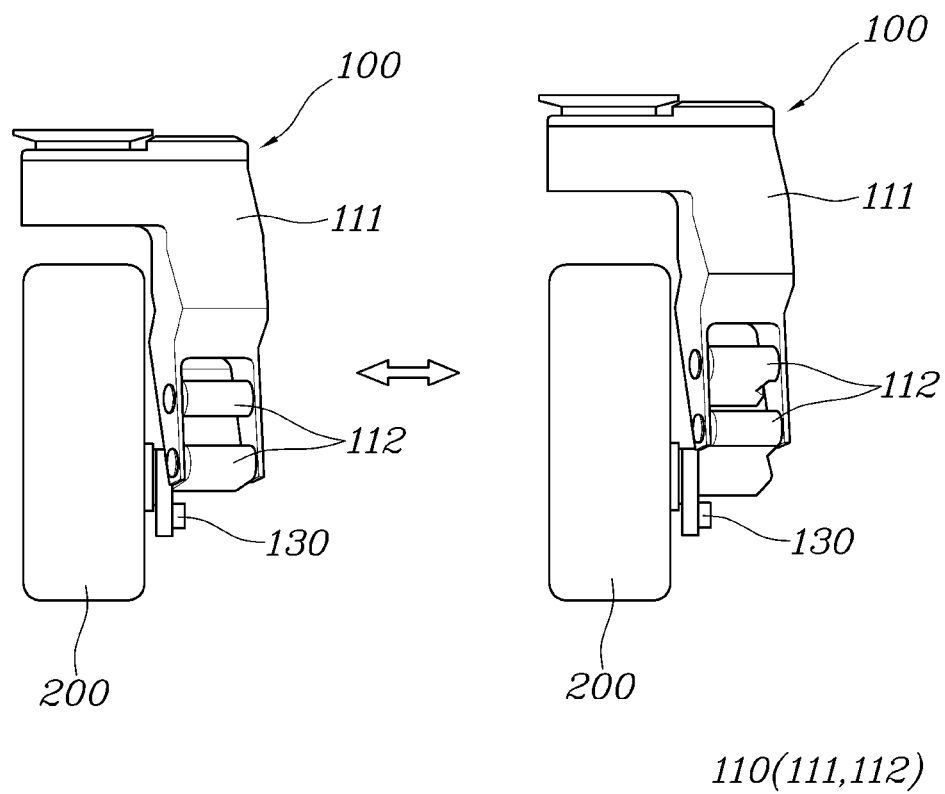
FIG. 4 is a front view illustrating a state in which an independent driving module is extended or retracted in an upward/downward direction.
Figure 5:
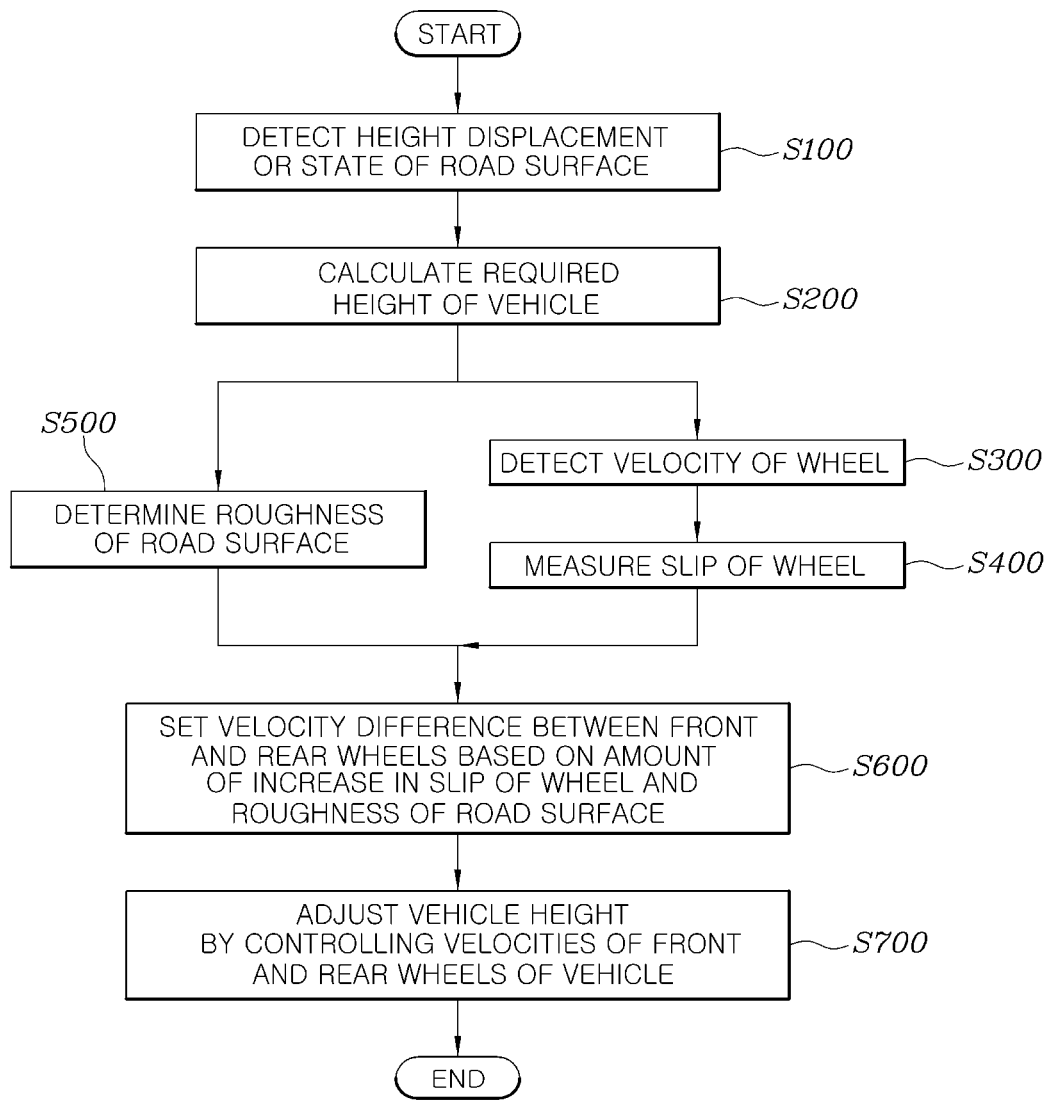
FIG. 5 is a flowchart illustrating a vehicle control method according to the embodiment of the present invention.

FIG. 1 is a configuration view illustrating a vehicle control system according to an embodiment of the present invention, FIG. 2 is a side view illustrating a state in which a vehicle body 300 is raised, FIG. 3 is a side view illustrating a state in which the vehicle body 300 is restored to an original position, and FIG. 4 is a front view illustrating a state in which an independent driving module 100 is extended or retracted in an upward/downward direction.

Exemplary embodiments of the vehicle control system according to the present invention will be described with reference to FIGS. 1 to 4.

The vehicle control system according to the present invention may adjust a vehicle height of a vehicle by controlling the independent driving modules 100 that connect the vehicle body 300 and wheels 200 and independently steer and operate the wheels 200.

The vehicle control system according to the present invention includes: the independent driving modules 100 each including a connection device 110 having a rotation center spaced apart from a driving shaft of the wheel 200 in a forward/rearward direction and configured to connect the wheel 200 and the vehicle body 300 so that the wheel 200 is moved in the forward/rearward direction or the upward/downward direction, a shock absorber 120 extending in a longitudinal direction thereof, configured to be contracted or stretched, configured to connect the vehicle body 300 and the connection device 110, and configured to restrict an upward/downward movement of the connection device 110, and a driving device 130 configured to rotate the wheel 200; a road surface detection unit 10 configured to detect a height displacement or a state of a road surface on which the vehicle travels; and a control unit 20 configured to control velocities of front and rear wheels of the independent driving modules 100 to change the vehicle height of the vehicle based on the height displacement or the state of the road surface detected by the road surface detection unit 10.

As illustrated in FIGS. 1 to 4, the connection device 110 connects the vehicle body 300 and the wheel 200 of the vehicle. The connection device 110 may rotate the wheel 200 in the forward/rearward direction and the upward/downward direction about the rotation center disposed at a position spaced apart from the driving shaft of the wheel 200.

The driving device 130 may be mounted on the independent driving module 100 mounted on each of the wheels 200 and independently operate the wheel 200.

The shock absorber 120 may absorb impact or vibration transmitted to the vehicle body 300 through the wheel 200 from the road surface while being stretched or compressed in the upward/downward direction, thereby restricting a rotation angle of the connection device 110.

The road surface detection unit 10 may detect the height displacement of the road surface on which the vehicle travels. A large height displacement may be detected in the case of an off-road surface on which stones or gravels are present. A small height displacement may be detected in the case of an on-road surface such as an expressway or a downtown road.

In addition, the road surface detection unit 10 may detect a state of a road surface on which the vehicle travels.

For example, the road surface detection unit 10 may detect a state in which a large amount of soil or mud is present on a road surface which causes a large slip of the wheels 200 or a state in which a high frictional force occurs on a road such as an expressway which causes a small slip of the wheels 200.

When a large height displacement of the road surface is detected by the road surface detection unit 10, the control unit 20 may control the independent driving module 100 to increase the vehicle height.

In this case, the control unit 20 may control the independent driving modules 100 so that a velocity of the front wheel of the vehicle is relatively lower than a velocity of the rear wheel. The velocity difference between the front and rear wheels may increase a length of the connection device 110 in the upward/downward direction and increase the vehicle height.

The vehicle height is increased on an off-road surface on which stones or gravels are present, which makes it possible to prevent a lower portion of the vehicle from being damaged by the stone or gravel.

The independent driving module 100 may be mounted on each of the wheels 200 of the vehicle and independently operate the wheel 200.

The independent driving modules 100 respectively mounted on the front and rear wheels of the vehicle may independently control the velocities and the steering operations of the wheels 200.

Therefore, it is possible to increase the vehicle height by controlling the velocities of the front and rear wheels of the vehicle.

In addition, the vehicle mounted with the independent driving modules 100 may turn in place or travel in a transverse direction. Therefore, a driver may conveniently park the vehicle, and a turning angle of the vehicle may be larger than that of a general vehicle even when the vehicle travels.

The connection device 110 may include a body part 111 having one end connected to the vehicle body 300, and a connection link 112 provided in the form of a four-joint link and configured to connect the other end of the body part 111 and the wheel 200. The connection link 112 has a rotation center spaced apart from the driving shaft of the wheel 200 and moves the wheel 200 in the forward/rearward direction or the upward/downward direction.

Further referring to FIGS. 2 to 4, the connection device included in the independent driving module 100 includes the body part 111 having one end extending from the vehicle body 300 toward the wheel 200, and the connection link 112 configured to connect the other end of the body part 111 and the wheel 200.

The connection link 112 may have a four-joint link structure and have one end connected to the other end of the body part 111, and the other end connected to the driving shaft of the wheel 200. The connection link 112 may have the four-joint link structure, have the rotation center spaced apart from the driving shaft of the wheel 200, and move the wheel 200 in the forward/rearward direction and the upward/downward direction.

The connection devices 110 respectively mounted on the front and rear wheels may be symmetrically mounted on the vehicle body 300.

To increase or decrease the vehicle height of the vehicle, the connection devices 110 respectively mounted on the front and rear wheels are symmetrically mounted, and the driving devices 130 respectively control the velocities of the front and rear wheels of the vehicle, such that the vehicle height of the vehicle may be increased by the velocity difference between the front and rear wheels. When the velocities of the front and rear wheels are equal to each other, the vehicle height is decreased, and the vehicle body 300 may be lowered and restored to the original position.

The road surface detection unit 10 may be connected to an ultrasonic sensor 11 mounted in the vehicle and detect the height displacement or the state of the road surface.

As illustrated in FIGS. 2 to 3, the road surface detection unit 10 may be connected to the ultrasonic sensor 11 mounted at a front side of the vehicle and detect the height displacement or the state of the road surface on which the vehicle travels.

The road surface detection unit 10 may be connected to a detection sensor as well as the ultrasonic sensor 11 and detect the height displacement or the state of the road surface on which the vehicle travels.

The vehicle control system may further include a calculation unit 30 configured to calculate a required height of the vehicle when the height displacement of the road surface detected by the road surface detection unit 10 exceeds a preset value. The control unit 20 may control the velocities of the front and rear wheels of the independent driving modules 100 to change the vehicle height of the vehicle based on the required height calculated by the calculation unit 30.

The calculation unit 30 may calculate the required height of the vehicle when the height displacement of the road surface detected by the road surface detection unit 10 is equal to or larger than a preset height.

Therefore, the control unit 20 may increase the vehicle height of the vehicle by implementing the velocity difference between the front and rear wheels of the vehicle based on the required height calculated by the calculation unit 30.

Therefore, it is possible to increase the vehicle height of the vehicle when the vehicle height of the vehicle is required to be increased.

When the height displacement of the road surface detected by the road surface detection unit 10 exceeds the preset value, the control unit 20 may increase the vehicle height by decreasing the velocity of the front wheel of the vehicle, increasing the velocity of the rear wheel of the vehicle, and increasing the length of the connection device 110 in the upward/downward direction.

At the time of controlling the velocities of the front and rear wheels of the vehicle, the control unit 20 decreases the velocity of the front wheel of the vehicle and increases the velocity of the rear wheel, such that the velocity difference occurs between the front and rear wheels. Therefore, there occurs a slip between the front and rear wheels, and the connection link 112 having the four-joint link structure is rotated upward, such that the body part 111 may be raised, and the vehicle height may be increased.

The vehicle control system may further include: the velocity detection unit 40 configured to detect the velocity of the wheel 200 of the vehicle; and the measurement unit 50 configured to measure the slip of the wheels 200 based on the velocity of the wheel 200 detected by the velocity detection unit 40 and the state of the road surface detected by the road surface detection unit 10. The control unit 20 may control the velocities of the front and rear wheels of the independent driving modules 100 based on the slip of the wheels 200 measured by the measurement unit 50.

The velocity detection unit 40 may detect the velocities of the front and rear wheels of the vehicle. The measurement unit 50 may measure the slip of the wheels 200 based on the state of the road surface detected by the road surface detection unit 10.

Because a large amount of slip occurs as the road surface on which the vehicle travels is slippery, a large amount of slip of the wheels 200 needs to occur to increase the vehicle height.

Therefore, the control unit 20 may set and control the velocity difference between the front and rear wheels of the vehicle based on the slip of the wheels 200 measured by the measurement unit 50.

The control unit 20 may increase the vehicle height by decreasing the velocity of the front wheel of the vehicle, increasing the velocity of the rear wheel of the vehicle, and increasing the length of the connection device 110 in the upward/downward direction. The control unit 20 may increase the velocity difference between the front and rear wheels the amount of increase in slip of the wheels 200 measured by the measurement unit 50.

When a small amount of slip of the wheels 200 is measured by the measurement unit 50, the control unit 20 may generate a small amount of velocity difference between the front and rear wheels of the vehicle. When a large amount of slip of the wheels 200 of the measurement unit 50, the control unit 20 may generate a large amount of velocity difference between the front and rear wheels of the vehicle to increase the vehicle height.

The vehicle control system may further include the roughness determination unit 60 configured to determine roughness of the road surface based on the state of the road surface detected by the road surface detection unit 10. The control unit 20 may control the velocities of the front and rear wheels of the independent driving modules 100 based on the roughness of the road surface determined by the roughness determination unit 60.

The roughness determination unit 60 may determine the roughness of the road surface based on the state of the road surface detected by the road surface detection unit 10.

The control unit 20 may set and control the velocity difference between the front and rear wheels of the vehicle based on the roughness determined by the roughness determination unit.

Therefore, when the vehicle travels on a slippery road surface with low roughness, the control unit 20 may set and control the velocity difference between the front and rear wheels in accordance with the state of the road surface.

The control unit 20 may increase the vehicle height by decreasing the velocity of the front wheel of the vehicle, increasing the velocity of the rear wheel of the vehicle, and increasing the length of the connection device 110 in the upward/downward direction. The control unit 20 may increase the velocity difference between the front and rear wheels when the roughness of the road surface determined by the roughness determination unit 60 is low.

When the roughness determination unit 60 determines that the road surface is rough, the control unit 20 may decrease the velocity difference between the front and rear wheels of the vehicle to increase the vehicle height. When the roughness determination unit 60 determines that the road surface is slippery, the control unit 20 may increase the velocity difference between the front and rear wheels of the vehicle to increase the vehicle height.

Therefore, the control unit 20 may control the velocities of the front and rear wheels of the vehicle based on the roughness state of the road surface.

Figure 6:
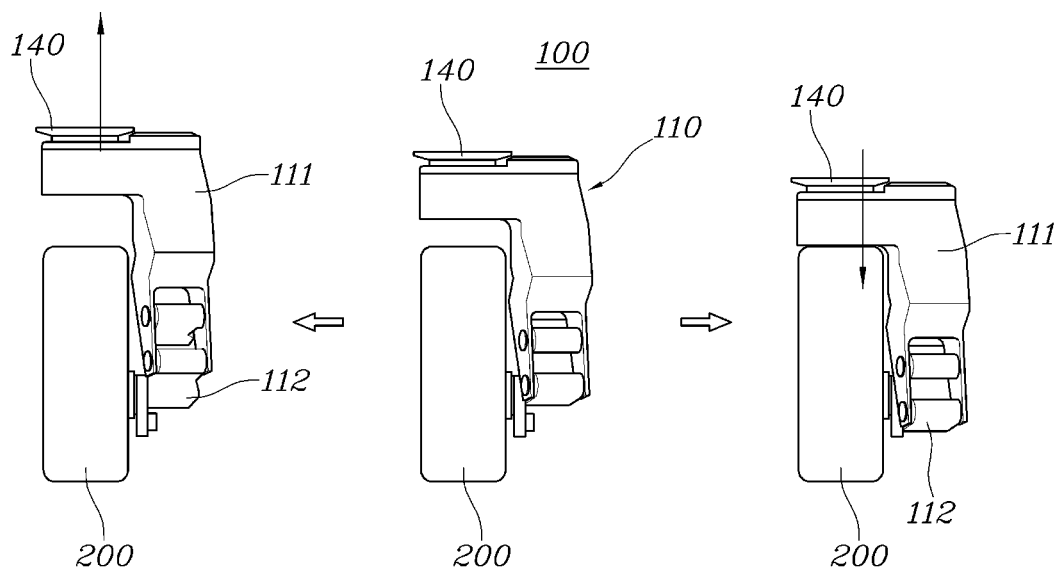
FIG. 6 is a front view illustrating a state in which an independent driving module of a vehicle control system according to another embodiment of the present invention is extended or retracted in an upward/downward direction.

FIG. 6 is a front view illustrating a state in which the independent driving module 100 of the vehicle control system according to the embodiment of the present invention is extended or retracted in the upward/downward direction.

The exemplary embodiments of the vehicle control system according to the present invention will be described with reference to FIGS. 1 and 6.

The vehicle control system according to the present invention may control the independent driving modules 100 that connect the vehicle body and the wheels 200 and independently steer and operate the wheels 200, thereby adjusting the vehicle height of the vehicle or implementing the deviation between the left and right sides of the vehicle.

Specifically, the vehicle control system according to the present invention includes the independent driving modules 100 each including the connection device 110 having the rotation center spaced apart from the driving shaft of the wheel 200 in the forward/rearward direction and configured to connect the wheel 200 and the vehicle body 300 so that the wheel 200 is moved in the forward/rearward direction or the upward/downward direction, the shock absorber 120 extending in the longitudinal direction thereof, configured to be contracted or stretched, configured to connect the vehicle body 300 and the connection device 110, and configured to restrict the upward/downward movement of the connection device 110, and the driving device 130 configured to rotate the wheel 200; the input unit 10 to which the target vehicle height of the vehicle or the deviation between the left and right sides of the vehicle is inputted; and the control unit 20 configured to control the operations of the independent driving modules 100 to change the vehicle height of the vehicle based on the target vehicle height of the vehicle inputted to the input unit 10.

As illustrated in FIGS. 1 to 6, the connection device 110 connects the vehicle body 300 and the wheel 200 of the vehicle. The connection device 110 may rotate the wheel 200 in the forward/rearward direction and the upward/downward direction about the rotation center disposed at the position spaced apart from the driving shaft of the wheel 200.

The driving device may be mounted on the independent driving module 100 mounted on each of the wheels 200 and independently operate the wheel 200.

The shock absorber 120 may absorb impact or vibration transmitted to the vehicle body through the wheel 200 from the road surface while being stretched or compressed in the upward/downward direction, thereby restricting the rotation angle of the connection device 110.

The target vehicle height of the vehicle or the deviation between the left and right sides of the vehicle may be inputted to the input unit 10 from the driver, and the control unit 20 may adjust the vehicle height of the vehicle or implement the deviation between the left and right sides of the vehicle by controlling the independent driving modules 100 of the vehicle.

Therefore, the passenger may conveniently get in or out of the vehicle or freight may be conveniently loaded into the vehicle.

In addition, the deviation between the left and right sides of the vehicle is implemented when the vehicle is parked or stopped laterally on an upward or downward slope, such that the floor of the vehicle may be prevented from being inclined.

The independent driving module 100 may be mounted on each of the wheels 200 of the vehicle and independently operate the wheel 200.

Figure 7:
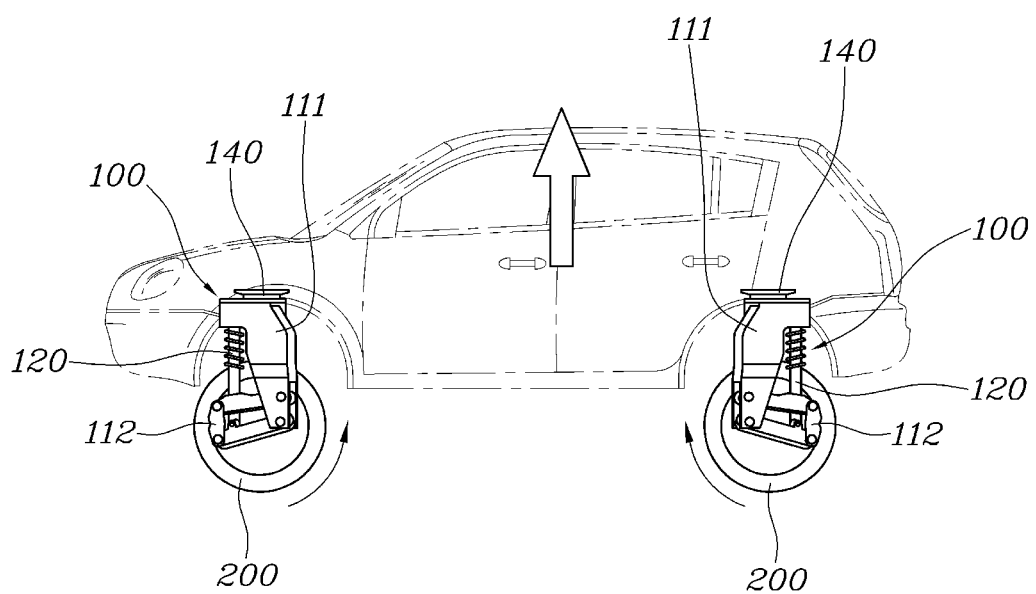
FIG. 7 is a side view illustrating a state in which the vehicle control system according to the embodiment of the present invention increases a vehicle height of a vehicle.
Figure 8:
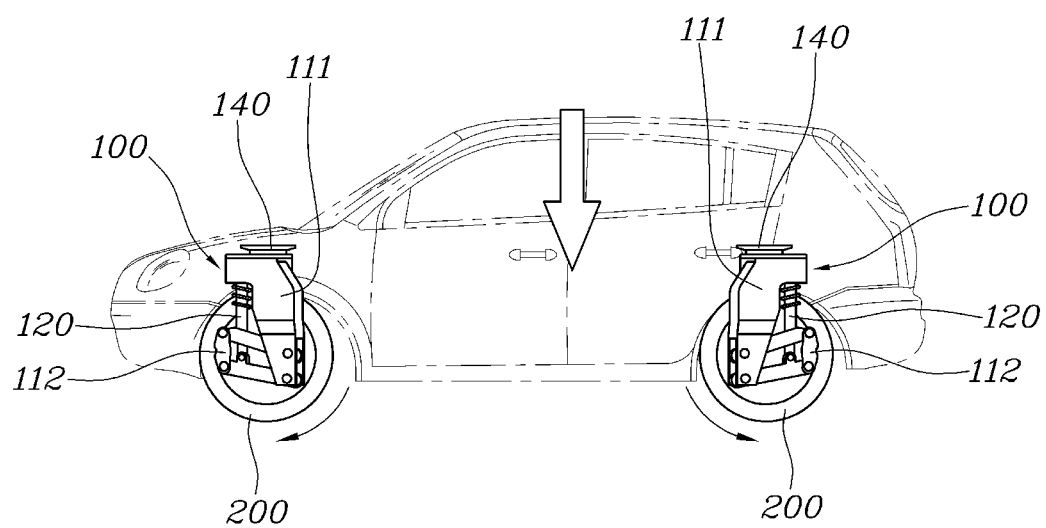
FIG. 8 is a side view illustrating a state in which the vehicle control system according to the embodiment of the present invention decreases the vehicle height of the vehicle.

FIG. 7 is a side view illustrating a state in which the vehicle control system according to the embodiment of the present invention increases a vehicle height of a vehicle, and FIG. 8 is a side view illustrating a state in which the vehicle control system according to the embodiment of the present invention decreases the vehicle height of the vehicle.

The connection device 110 may include the body part 111 having one end connected to the vehicle body, and the connection link 112 provided in the form of a four-joint link and configured to connect the other end of the body part 111 and the wheel 200. The connection link 112 has the rotation center spaced apart from the driving shaft of the wheel 200 and moves the wheel 200 in the forward/rearward direction or the upward/downward direction.

Further referring to FIGS. 7 to 8, the connection device included in the independent driving module 100 includes the body part 111 having one end extending from the vehicle body toward the wheel 200, and the connection link 112 configured to connect the other end of the body part 111 and the wheel 200.

The connection link 112 may have the four-joint link structure and have one end connected to the other end of the body part 111, and the other end connected to the driving shaft of the wheel 200. The connection link 112 may have the four-joint link structure, have the rotation center spaced apart from the driving shaft of the wheel 200, and move the wheel 200 in the forward/rearward direction and the upward/downward direction.

The connection devices 110 respectively mounted on the front and rear wheels may be symmetrically mounted on the vehicle body.

To increase the vehicle height of the vehicle, the connection devices 110 respectively mounted on the front and rear wheels are symmetrically mounted, and the driving devices rotate the front and rear wheels in the opposite directions, such that the connection links 112 are symmetrically moved, and the vehicle height of the vehicle may be increased or decreased.

When the target vehicle height is inputted to the input unit 10 to increase the vehicle height of the vehicle, the control unit 20 may control the independent driving modules 100 so that the front wheel of the vehicle rotates rearward, the rear wheel rotates forward, the lengths of the connection devices 110 increase, the shock absorbers 120 are stretched, and the vehicle height increases.

As illustrated in FIG. 7, when the target vehicle height is inputted to the input unit 10 to increase the vehicle height of the vehicle, the control unit 20 may increase the vehicle height of the vehicle by controlling the driving devices of the independent driving modules 100.

The driving device mounted on the front wheel operates and rotates the front wheel rearward, and the driving device mounted on the rear wheel operates and rotates the rear wheel forward, such that the front and rear wheels may rotate in the opposite directions, the connection links 112 of the connection devices 110 may rotate, the vehicle body may move upward, and the vehicle height may be increased.

In this case, a maximum vehicle height may be a maximum stretch length of the shock absorber 120, and the shock absorber 120 may restrict the rotation angle of the connection link 112.

Therefore, the vehicle height of the vehicle may be increased, and the freight may be conveniently loaded into the vehicle.

When the target vehicle height is inputted to the input unit 10 to decrease the vehicle height of the vehicle, the control unit 20 may control the independent driving modules 100 so that the front wheel of the vehicle rotates forward, the rear wheel rotates rearward, the lengths of the connection devices 110 decrease, the shock absorbers 120 are compressed, and the vehicle height decreases.

As illustrated in FIG. 8, when the target vehicle height is inputted to the input unit 10 to decrease the vehicle height of the vehicle, the control unit 20 may decrease the vehicle height of the vehicle by controlling the driving devices of the independent driving modules 100.

The driving device mounted on the front wheel operates and rotates the front wheel forward, and the driving device mounted on the rear wheel operates and rotates the rear wheel rearward, such that the front and rear wheels may rotate in the opposite directions, the connection links 112 of the connection devices 110 may rotate, the vehicle body may move downward, and the vehicle height may decrease.

In this case, a lowest vehicle height may be a maximum compression length of the shock absorber 120, and the shock absorber 120 may restrict the rotation angle of the connection link 112.

Therefore, the vehicle height of the vehicle may be decreased, and the passenger may conveniently get in or out of the vehicle.

The deviation between the left and right sides of the vehicle height may be inputted to the input unit 10, and the control unit 20 may control the independent driving modules 100 based on the deviation between the left and right sides of the vehicle inputted to the input unit 10 so that the vehicle is inclined to the left or right side.

The deviation between the left and right sides of the vehicle may be inputted to the input unit 10 from the driver, and the control unit 20 may adjust the deviation between the left and right sides of the vehicle by controlling the driving devices of the independent driving modules 100, such that the vehicle may be inclined.

The deviation between the left and right sides of the vehicle may be set when the vehicle is positioned on an upward or downward slope, which makes it possible to prevent the vehicle from being inclined.

Figure 9:
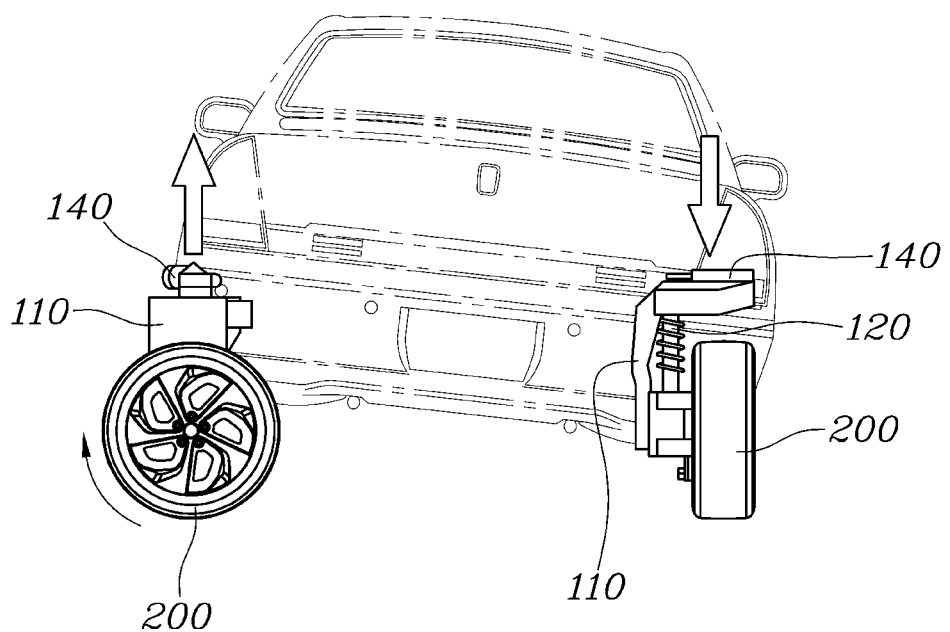
FIG. 9 is a view illustrating a first embodiment of the vehicle control system according to the embodiment of the present invention for implementing a deviation between left and right sides of the vehicle.

FIG. 9 is a view illustrating a first embodiment of the vehicle control system according to the embodiment of the present invention for implementing the deviation between the left and right sides of the vehicle.

The independent driving module 100 includes a steering device 140 configured to steer a direction of the wheel 200 by rotating the connection device 110. When the deviation between the left and right sides is inputted to the input unit 10 to incline the vehicle to the left or right side, the control unit 20 may control the steering device 140 to rotate the wheel 200, which is disposed in a direction opposite to the direction in which the vehicle is inclined, from the center of the vehicle to the outside of the vehicle, and the control unit 20 may control the driving device to rotate the wheel 200 to the outside of the vehicle.

The independent driving module 100 may have the steering device 140 that adjusts the direction of the wheel 200 by rotating the connection device 110.

Further referring to FIG. 9, when the deviation between the left and right sides of the vehicle is inputted to the input unit 10, the control unit 20 may control the steering device 140 in the direction opposite to the direction in which the vehicle is inclined to rotate the steering devices 140 for the front and rear wheels by 90° from the center of the vehicle to the outside of the vehicle. Further, the control unit 20 may control the driving devices to rotate the front and rear wheels from the center of the vehicle to the outside of the vehicle in the direction opposite to the direction in which the vehicle is inclined. As a result, the connection links 112 are rotated, such that the deviation between the left and right sides of the vehicle may be implemented.

Figure 10:
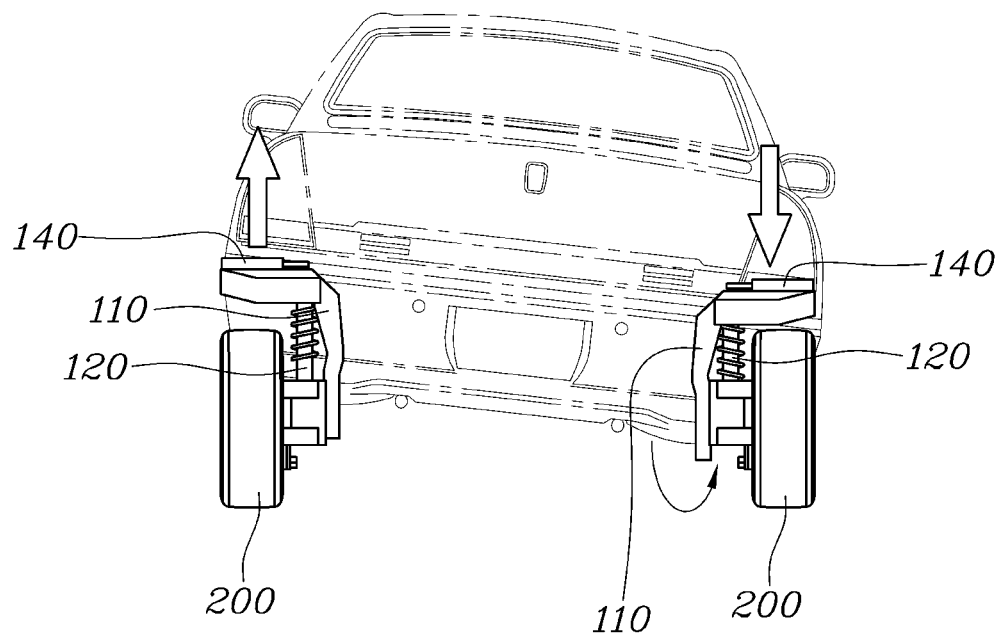
FIG. 10 is a view illustrating a second embodiment of the vehicle control system according to the embodiment of the present invention for implementing the deviation between the left and right sides of the vehicle.

FIG. 10 is a view illustrating a second embodiment of the vehicle control system according to the embodiment of the present invention for implementing the deviation between the left and right sides of the vehicle.

When the deviation between the left and right sides is inputted to the input unit 10 to incline the vehicle to the left or right side, the control unit 20 may control the driving devices to rotate the front and rear wheels 200, which are disposed in the direction in which the vehicle is inclined, from the center of the vehicle to the outside of the vehicle.

Further referring to FIG. 10, when the deviation between the left and right sides of the vehicle is inputted to the input unit 10, the control unit 20 controls the driving device in the direction opposite to the direction in which the vehicle is inclined to rotate the front and rear wheels toward the center of the vehicle in the direction opposite to the direction in which the vehicle is inclined. As a result, the connection links 112 are inclined, and the vehicle is raised in the direction opposite to the direction in which the vehicle is inclined, such that the deviation between the left and right sides of the vehicle is implemented.

A vehicle control method according to the present invention includes: a road surface detection step S100 of detecting a height displacement or a state of a road surface on which the vehicle travels; and a control step S700 of controlling the velocities of the front and rear wheels of the independent driving modules 100 to change the vehicle height of the vehicle based on the height displacement or the state of the road surface detected in the road surface detection step S100.

The vehicle control method may further include a calculation step S200 of calculating a required height of the vehicle when the height displacement of the road surface detected in the road surface detection step S100 exceeds a preset value. The control step S700 may control the velocities of the front and rear wheels of the independent driving modules 100 to change the vehicle height of the vehicle based on the required height calculated in the calculation step S200.

When the height displacement of the road surface detected in the road surface detection step S100 exceeds the preset value, the control step S700 may increase the vehicle height by decreasing the velocity of the front wheel of the vehicle, increasing the velocity of the rear wheel of the vehicle, and increasing the length of the connection device 110 in the upward/downward direction.

The vehicle control method may further include: a velocity detection step S300 of detecting the velocity of the wheel 200 of the vehicle after the road surface detection step S100; and a measurement step S400 of measuring a slip of the wheel 200 based on the velocity of the wheel 200 detected in the velocity detection step S300 and the state of the road surface detected in the road surface detection step S100. The control step S700 may control the velocities of the front and rear wheels of the independent driving modules 100 based on the slip of the wheels 200 measured in the measurement step S400.

The vehicle control method may further include a setting step S600 of setting the velocity difference between the front and rear wheels based on the amount of increase in slip of the wheel 200 measured in the measurement step S400. The control step S700 may increase the vehicle height by decreasing the velocity of the front wheel of the vehicle, increasing the velocity of the rear wheel of the vehicle, and increasing the length of the connection device 110 in the upward/downward direction based on the velocity difference between the front and rear wheels set in the setting step S600.

The vehicle control method may further include a roughness determination step S500 of determining roughness of the road surface based on the state of the road surface detected in the road surface detection step S100. The control step S700 may control the velocities of the front and rear wheels of the independent driving modules 100 based on the roughness of the road surface determined in the roughness determination step S500.

The vehicle control method may further include a setting step S600 of setting the velocity difference between the front and rear wheels when the roughness of the road surface determined in the roughness determination step S500 is low. The control step S700 may increase the vehicle height by decreasing the velocity of the front wheel of the vehicle, increasing the velocity of the rear wheel of the vehicle, and increasing the length of the connection device 110 in the upward/downward direction based on the velocity difference between the front and rear wheels set in the setting step S600.

FIG. 11 is a flowchart illustrating a vehicle control method according to still another embodiment of the present invention.

A vehicle control method according to another embodiment of the present invention will be described with reference to FIG. 11.

The vehicle control method according to another embodiment of the present invention includes an input step S100' of inputting the target vehicle height of the vehicle or the deviation between the left and right sides of the vehicle; and a control step S200' of controlling the operations of the independent driving modules 100 to change the vehicle height of the vehicle based on the target vehicle height of the vehicle inputted to the input step S100'.

The input step S100' may include a vehicle height input step S110 of inputting the vehicle height of the vehicle. The control step S200' may include a first control step S210 of controlling the independent driving modules 100 so that the front wheel of the vehicle rotates rearward, the rear wheel rotates forward, the lengths of the connection devices 110 increase, the shock absorbers 120 are stretched, and the vehicle height is increased when the target vehicle height is inputted in the vehicle height input step S110 to increase the vehicle height of the vehicle.

The input step S100' may include a vehicle height input step S110 of inputting the vehicle height of the vehicle. The control step S200' may include a second control step S220 of controlling the independent driving modules 100 so that the front wheel of the vehicle rotates forward, the rear wheel rotates rearward, the lengths of the connection devices 110 decrease, the shock absorbers 120 are compressed, and the vehicle height is decreased when the target vehicle height is inputted to the input unit 10 to decrease the vehicle height of the vehicle.

The independent driving module 100 may include the steering device 140 configured to steer the direction of the wheel 200 by rotating the connection device 110. The input step S100' may include an input step S120 of inputting the deviation between the left and right sides and inputting the vehicle height of the vehicle. The control step S200' may include a third control step S230 of controlling the steering device 140 to rotate the wheel 200, which is disposed in the direction opposite to the direction in which the vehicle is inclined, from the center of the vehicle to the outside of the vehicle, and controlling the driving device to rotate the wheel 200 to the outside of the vehicle when the deviation between the left and right sides is inputted in the input step of inputting the deviation between the left and right sides so that the vehicle is inclined to the left or right side.

The input step S100' may include the input step of inputting the deviation between the left and right sides and inputting the vehicle height of the vehicle. The control step S200' may include a fourth control step S240 of controlling the driving devices to rotate the front and rear wheels 200, which are disposed in the direction in which the vehicle is inclined, from the center of the vehicle to the outside of the vehicle when the deviation between the left and right sides is inputted in the input step of inputting the deviation between the left and right sides so that the vehicle is inclined to the left or right side.

The vehicle control system described herein may increase the vehicle height of the vehicle by controlling the velocities of the front and rear wheels of the vehicle using the independent driving modules.

In addition, the vehicle control system may set a velocity difference between the front and rear wheels of the vehicle, which makes it possible to increase the vehicle height of the vehicle without using a separate vehicle height adjustment device while the vehicle travels.

In addition, the vehicle control system may detect a state of a road surface using the ultrasonic sensor mounted on the vehicle and increase the vehicle height of the vehicle based on the state of the road surface.

While the specific embodiments of the present invention have been illustrated and described above, it will be obvious to those skilled in the art that the present invention may be variously modified and changed without departing from the technical spirit of the present invention defined in the appended claims.

What is claimed is:

1. A system for controlling a vehicle, the system comprising:
    a controller configured to:
        control velocities of front and rear wheels of the vehicle;
        receive an input of a target height of the vehicle; and
        change a vehicle height of the vehicle based on the target height; and
    independent driving modules,
    wherein each independent driving module of the independent driving modules comprises:
        a connection device having a rotation center spaced apart from a driving shaft of a wheel of the front and rear wheels in a forward/rearward direction and being configured to connect the wheel and a vehicle body so that the wheel is moved in the forward/rearward direction or an upward/downward direction;
        a shock absorber extending in a longitudinal direction and being configured to contract or stretch, to connect the vehicle body and the connection device, and to restrict an upward/downward movement of the connection device; and
        a driving device configured to rotate the wheel, and
    wherein each wheel of the front and rear wheels comprises the independent driving module.

2. The system of claim 1, wherein the independent driving module is mounted on the each wheel of the vehicle and is configured to independently operate the wheel.

3. The system of claim 1, wherein the connection device comprises:

a body part having a first end connected to the vehicle body; and
a connection link provided in the form of a four-joint link, the connection link being configured to:
  connect a second end of the body part and the wheel, to have a rotation center spaced apart from the driving shaft of the wheel; and
  move the wheel in the forward/rearward direction or the upward/downward direction.

4. The system of claim 1, wherein the connection device mounted on the front and rear wheels are symmetrically mounted on the vehicle body.

5. The system of claim 1, wherein the controller is further configured to control the independent driving modules so that the front wheels of the vehicle rotate rearward, the rear wheels rotate forward, lengths of the connection devices increase, the shock absorbers are stretched, and the vehicle height is increased, in response to the controller receiving a target height of the vehicle to increase the vehicle height.

6. The system of claim 1, wherein the controller is further configured to control the independent driving modules so that the front wheels of the vehicle rotate forward, the rear wheels rotate rearward, lengths of the connection devices decrease, the shock absorbers is compressed, and the vehicle height is decreased, in response to the controller receiving a target height of the vehicle to decrease the vehicle height.

7. The system of claim 1, wherein the controller is further configured to:
  receive a deviation between left and right sides of the vehicle; and
  control operations of the independent driving modules so that the vehicle is inclined to a left or right side based on the received deviation.

8. The system of claim 1,
wherein the independent driving modules each comprise a steering device configured to steer a direction of the wheel by rotating the connection device, and
wherein the controller is further configured to:
  control the steering device to rotate the wheel, which is disposed in a direction opposite to a direction in which the vehicle is inclined, from a center of the vehicle to outside of the vehicle; and
  control the driving device to rotate the wheel to the outside of the vehicle, in response to a deviation between left and right sides of the vehicle being input to the controller to incline the vehicle to a left or right side.

9. The system of claim 8, wherein the controller is further configured to control the driving devices to rotate the front and rear wheels, which are disposed in the direction in which the vehicle is inclined, from the center of the vehicle to the outside of the vehicle, in response to a deviation between left and right sides of the vehicle being input to the controller to incline the vehicle to a left or right side.

10. The system of claim 1, further comprising:
a road surface detector configured to detect a height displacement or a state of a road surface,
wherein the controller is further configured to:
  control velocities of the front and rear wheels; and
  change a vehicle height of the vehicle based on the height displacement or the state of the road surface.

11. The system of claim 10, wherein the road surface detector is connected to an ultrasonic sensor mounted in the vehicle and is configured to detect the height displacement or the state of the road surface.

12. The system of claim 10, further comprising:
a calculator configured to calculate the target height of the vehicle, in response to the height displacement of the road surface detected by the road surface detector exceeding a threshold,
wherein the controller is further configured to:
  control the velocities of the front and rear wheels; and
  change the vehicle height based on the target height calculated by the calculator.

13. The system of claim 10, wherein the controller is further configured to increase the vehicle height by decreasing the velocity of at least one of the front wheels of the vehicle, increasing the velocity of at least one of the rear wheels of the vehicle, and increasing a length of the connection device in the upward/downward direction, in response to the height displacement of the road surface detected by the road surface detector exceeding a threshold.

14. The system of claim 10, further comprising:
a velocity detector configured to detect a velocity of the wheel; and
a measurer configured to measure a slip of the wheel based on the velocity and the state of the road surface,
wherein the controller is further configured to control the velocities of the front and rear wheels based on the slip of the wheels measured by the measurer.

15. The system of claim 14, wherein the controller is further configured to:
increase the vehicle height by decreasing the velocity of at least one of the front wheels of the vehicle, increasing the velocity of at least one of the rear wheels of the vehicle, and increasing lengths of the connection devices in the upward/downward direction; and
increase a velocity difference between the front and rear wheels based on an increase in the slip of the wheel measured by the measurer.

16. The system of claim 10, further comprising:
a roughness determiner configured to determine roughness of the road surface based on the state of the road surface detected by the road surface detector,
wherein the controller is further configured to control the velocities of the front and rear wheels based on the roughness of the road surface determined by the roughness determiner.

17. The system of claim 11, wherein the controller is further configured to:
increase the vehicle height by decreasing the velocity of at least one of the front wheels of the vehicle, increasing the velocity of at least one of the rear wheels of the vehicle, and increasing lengths of the connection devices in the upward/downward direction; and
increase a velocity difference between the front and rear wheels, in response to the roughness of the road surface being determined to be low.

18. A system for controlling a vehicle, the system comprising:
a controller configured to:
  control velocities of front and rear wheels of the vehicle;
  receive a target height of the vehicle; and
  change a vehicle height of the vehicle based on the target height; and
an independent driving module comprising:
  a connection device having a rotation center spaced apart from a driving shaft of a wheel of the front and rear wheels in a forward/rearward direction, the connection device configured to:

connect the wheel and a vehicle body; and
move the wheel in the forward/rearward direction or an upward/downward direction; and a driving device configured to rotate the wheel, wherein the independent driving module is mounted on the wheel and is configured to independently operate the wheel.

\* \* \* \* \*